D. E. WILSON.
MOTOR METER LOCK.
APPLICATION FILED OCT. 1, 1920.
1,379,669.
Patented May 31, 1921.
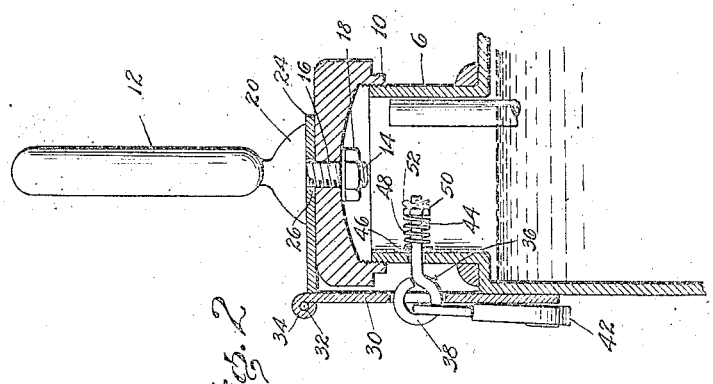
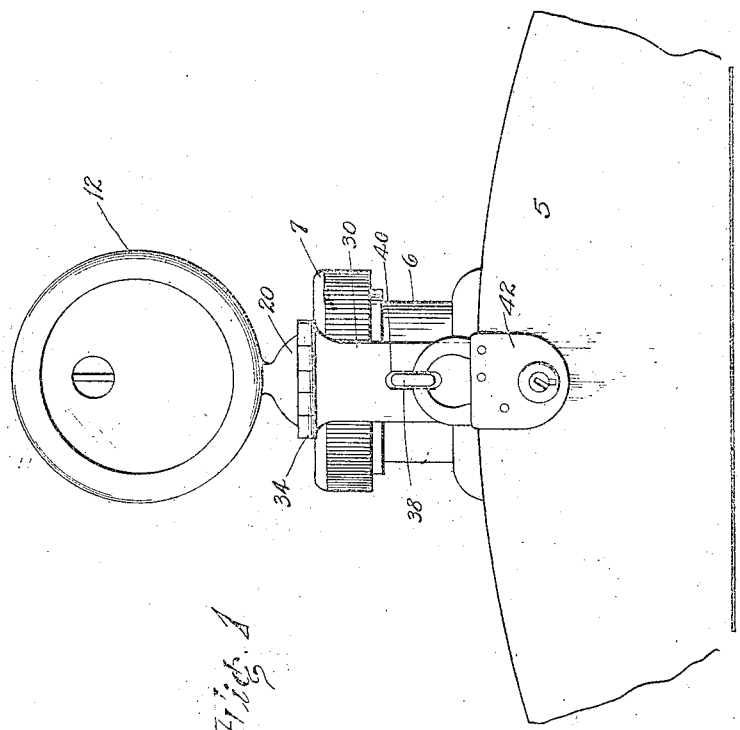
Inventor
D. E. Wilson
By Lacey & Lacey, Attorneys

UNITED STATES PATENT OFFICE.

DEWEY E. WILSON, OF OAKLAND, IOWA.

MOTOR-METER LOCK.

1,379,669.  Specification of Letters Patent.  Patented May 31, 1921.

Application filed October 1, 1920. Serial No. 413,965.

*To all whom it may concern:*

Be it known that I, DEWEY E. WILSON, a citizen of the United States, residing at Oakland, in the county of Pottawattamie and State of Iowa, have invented certain new and useful Improvements in Motor-Meter Locks, of which the following is a specification.

This invention relates to improvements in locks especially adapted for use on motor vehicles.

More particularly, this invention aims to provide a lock which may be employed for preventing the theft of motor meters employed extensively on motor vehicles for indicating the temperature of the water in the radiator. The aforesaid motor meters are connected to the cap of the radiator and by simply unscrewing the radiator cap, the meter is removed from the radiator. Therefore by locking the cap of the radiator to the neck of the radiator, the theft of the meter is prevented.

One of the principal objects of the invention is to provide a lock of the class described which may be applied without altering the construction of the meter or the radiator and which when in position will not mar the appearance of the vehicle to an appreciable extent.

A further object of the invention is to provide a lock of the class described having novel means whereby the same is prevented from rattling due to the vibration or movement of the machine.

The invention forming the subject matter of this application aims also to provide a lock of the class described which is of highly simplified construction, neat in appearance and cheap to manufacture.

Other objects and advantages of the invention will be apparent during the course of the following description.

In the accompanying drawing forming a part of this application and in which like numerals are employed to designate like parts throughout the same:

Figure 1 is a front elevation of the improved lock applied;

Fig. 2 is a detail sectional view through a radiator, the improved lock being shown applied.

In the drawing wherein for the purpose of illustration is shown a preferred embodiment of the invention, the numeral 5 designates a radiator having a neck 6 through which water may be introduced into the radiator. The usual cap 7 is provided with an interiorly screw-threaded flange 10 threaded onto the neck 6 to close the radiator.

A motor meter designated by the numeral 12 is provided with a shank 14 which is extended through an opening 16 in the cap and which is engaged by a nut 18 arranged within the cap. Upon tightening the nut 18, the flange 20 at the base of the meter is firmly engaged with the cap so that the meter is securely held in position. The shank 14 is, of course, hollow so that the temperature of the water within the radiator will be caused to act on the indicator and thereby register the temperature on the indicator of the meter. It will be seen that by merely unscrewing the cap, the meter also will be removed so that unless some theft-preventing means is provided it will be a comparatively easy matter to steal the meter.

The invention forming the subject matter of this application and which is adapted to prevent the theft of the meter embodies an attaching plate 24 mounted flatly upon the radiator cap and provided with an opening 26 which receives the shank 14. The flange 20 at the base of the meter is drawn securely into contact with the attaching plate when the nut 18 is tightened whereby the attaching plate is held firmly in position.

As illustrated in Fig. 2, one end portion of the attaching plate 24 is extended beyond the adjacent side of the cap 7 and hingedly supports a hasp designated by the numeral 30. The attaching plate and the hasp are connected by means of a hinge pin 32 extended through alined hinge barrels 34 in the attaching plate and the hasp, though it is obvious that any other suitable means may be employed for swingingly connecting the hasp to the member 24.

A keeper generally designated by the numeral 36 is provided with a looped head 38 adapted to be passed through an opening 40 in the hasp and engaged by a pad lock 42 whereby the hasp is locked to the neck 6. The shank 44 of the keeper is slidable through an opening 46 in the neck 6 and is surrounded by a retractile coil spring 48 which serves to draw the entire keeper inwardly or toward the center of the neck, whereby the hasp is drawn flatly into contact with the front of the radiator head so as to prevent rattling. Also the spring 48 draws the hasp inwardly so that the pad lock will be yieldably held in position and will be prevented from rattling during the travel of the vehicle. A tensioning nut 50 is threaded on the shank 44 and serves as a stop element for one end of the spring 48 while the wall of the neck 6 serves as a stop element or abutment for the other end of the spring. A retaining element in the form of a cotter pin 52 is extended through the shank 44 so as to prevent the displacement of the nut 50.

In applying the improved lock, it is merely necessary to detach the meter 12 by removing the nut 18 so that the attaching plate 24 may be confined between the flange 20 and the upper side of the cap. A hole may be drilled through the neck 6 so that the shank of the keeper may be connected to the neck 6. When it is desired to fill the radiator with water, the pad lock may be detached so as to permit the cap to be detached.

Having thus described the invention, what is claimed as new is:

1. The combination with a radiator having a neck and a cap threaded thereon, of a meter connected to the cap, an attaching plate engaged by said meter, a hasp carried by said attaching plate, and a yieldable keeper extending through the neck of said radiator and adapted for connection with said hasp.

2. The combination with a radiator having a neck and a cap, of a hasp connected to said cap, a keeper having a shank slidable through said neck, said keeper being provided with a head adapted to extend through said hasp, and a lock having connection with said head.

3. The combination with a radiator having a neck and a cap, of a hasp connected to said cap, a keeper having a shank slidable through said neck and a head adapted for connection with said hasp, a lock having connection with said head, and a spring mounted on said shank and drawing said hasp into contact with the radiator and drawing said lock into contact with said hasp whereby rattling is prevented.

4. The combination with a radiator having a neck and a cap threaded thereon, of a meter mounted on said cap, an attaching plate confined between said meter and said cap, a hasp swingingly supported by said plate and provided with an opening, a keeper having a looped head adapted for insertion through said opening, a lock engageable with said head, said keeper being provided with a shank slidable through said neck, a spring mounted on said shank and adapted for drawing said hasp into contact with said radiator and drawing said lock into contact with the hasp whereby rattling is prevented, and a nut threaded on said shank and constituting an abutment for said spring.

In testimony whereof I affix my signature.

DEWEY E. WILSON. [L. S.]